March 7, 1939. W. R. SCHLAGE Re. 21,024

LOCK MOUNTING FOR HOLLOW METAL DOORS

Original Filed Sept. 18, 1935 3 Sheets-Sheet 1

INVENTOR.
Walter R. Schlage

BY

Chas. E. Townsend.
ATTORNEY.

March 7, 1939. W. R. SCHLAGE Re. 21,024
LOCK MOUNTING FOR HOLLOW METAL DOORS
Original Filed Sept. 18, 1935 3 Sheets-Sheet 2
Fig. 5.
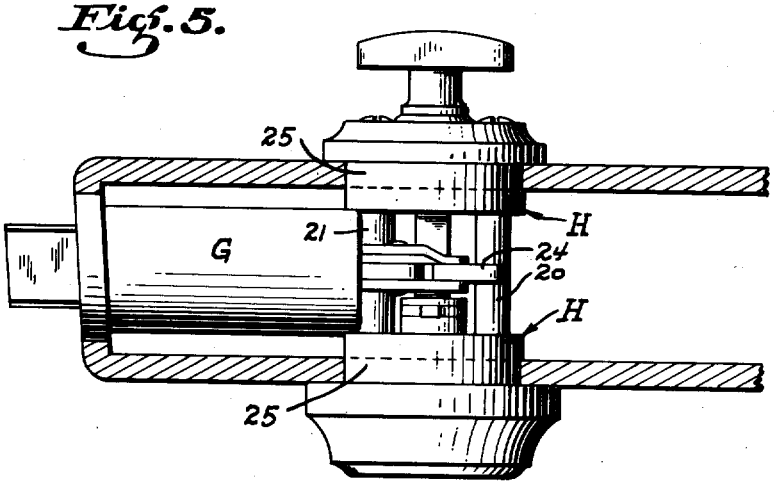
Fig. 7.
Fig. 6.
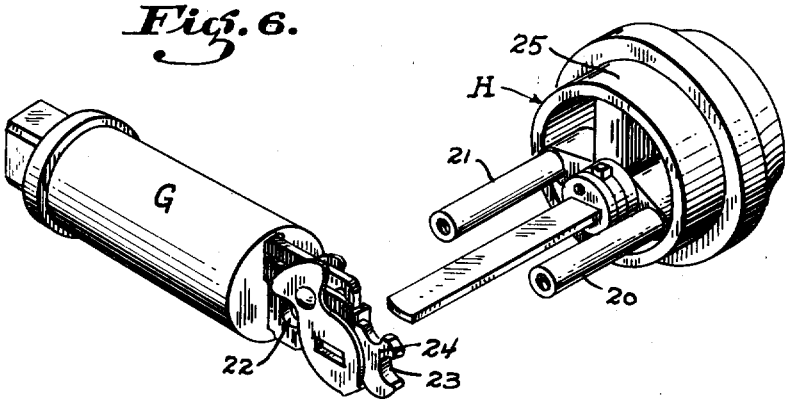
INVENTOR.
Walter R. Schlage.
BY
Chas. E. Townsend.
ATTORNEY.

March 7, 1939. W. R. SCHLAGE Re. 21,024

LOCK MOUNTING FOR HOLLOW METAL DOORS

Original Filed Sept. 18, 1935 3 Sheets-Sheet 3

INVENTOR.
Walter R. Schlage.

BY

Chas. E. Townsend.
ATTORNEY.

Reissued Mar. 7, 1939 Re. 21,024

UNITED STATES PATENT OFFICE 21,024

LOCK MOUNTING FOR HOLLOW METAL DOORS

Walter R. Schlage, Palo Alto, Calif., assignor to Schlage Lock Company, San Francisco, Calif., a corporation of California Original No. 2,091,248, dated August 24, 1937, Serial No. 41,064, September 18, 1935. Application for reissue January 17, 1938, Serial No. 185,476

12 Claims. (Cl. 292—337)

This invention relates to a lock mounting for hollow metal doors.

In building structures, which are fireproof throughout, metal doors are employed. Such doors are usually constructed of metal and include a metal panel and a surrounding hollow metal stile. In some instances a door of this type is provided with a lock which consists of two separable units, to wit, a latch or bolt unit and a latch or bolt actuating unit. The latch unit is inserted in an opening formed in the edge of the stile, while the latch actuating unit is inserted in an opening formed in opposite faces of the stile. These units, when installed or inserted, must be anchored with relation to each other and with relation to the stile of the door, and they must be rigidly secured to prevent any play or rattle. The openings formed in the edge and in the opposite faces of the stile tend to weaken the structure and in many instances the metal forming the stile is so thin that an anchorage between the lock units and the door is anything but substantial.

The object of the present invention is generally to improve and simplify the construction and operation of lock mountings of the character described; to provide a member which is insertable through one of the openings formed in the face of the stile, which will assist in supporting the lock mechanism when installed and also serve to reinforce and strengthen the stile, as well as to maintain the faces of the stile in spaced relation one to the other and prevent their collapsing or buckling when the lock is assembled in a door; and further, to provide means on the lock mechanism for anchoring and securing said reinforcing and supporting member against removal when inserted.

The lock mounting is shown by way of illustration in the accompanying drawings, in which Fig. 1 is a horizontal cross section of a stile or of a hollow metal door showing the manner in which the two lock units are assembled and installed;

Fig. 5 is a horizontal section showing another form of lock mechanism when installed;

Fig. 6 is a perspective view of the latch unit shown in Fig. 5;

Fig. 7 is a perspective view showing the latch actuating mechanism disclosed in Fig. 5;

Figure 1:
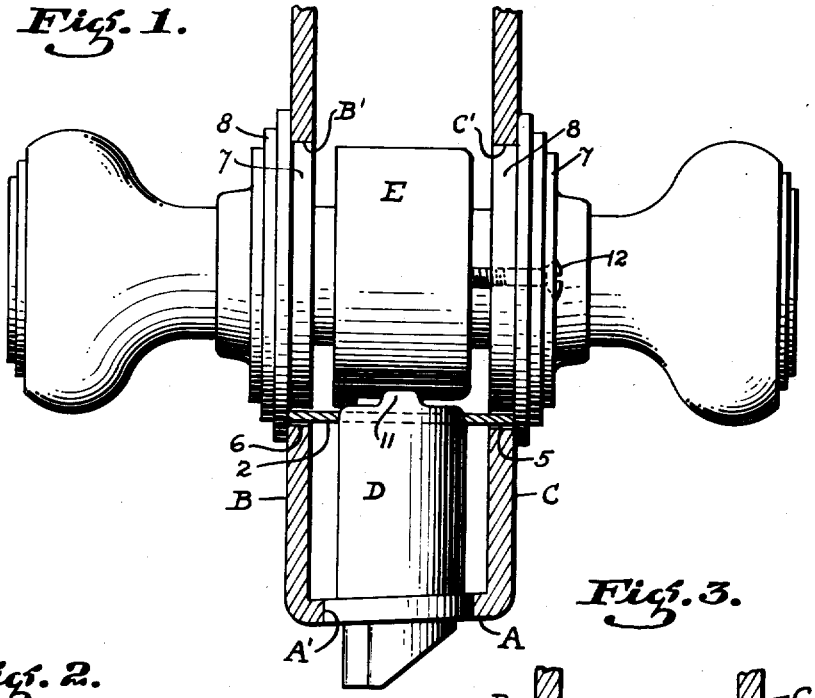
Figure 2:
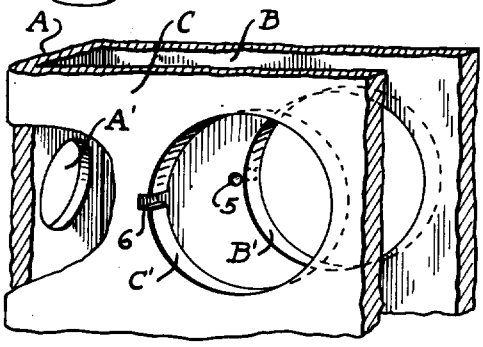
Fig. 2 is a perspective view of a portion of the hollow metal stile showing the openings formed in the edge and in the opposite faces of the stile.
Figure 4:
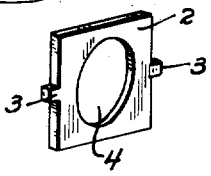
Fig. 4 is a perspective view of the reinforcing and supporting plate which is inserted between the inner faces of the stile.

Referring to the drawings in detail, and particularly to Figs. 1, 2 and 4, A indicates the outer edge, and B and C the opposite faces of the hollow metal stile of a door. Formed in the faces of the stile are openings B′ and C′, and similarly formed in the outer edge of the stile is an opening A′.

The type of lock illustrated in the present instance consists of two separable units, a latch unit indicated at D and a latch actuating unit indicated at E, the unit E being inserted through the openings B′ and C′, and the unit D through the opening A′. These units, when installed, must be anchored with relation to each other and to the stile of the door, and they must be rigidly and substantially secured to prevent play or rattle.

Figure 3:
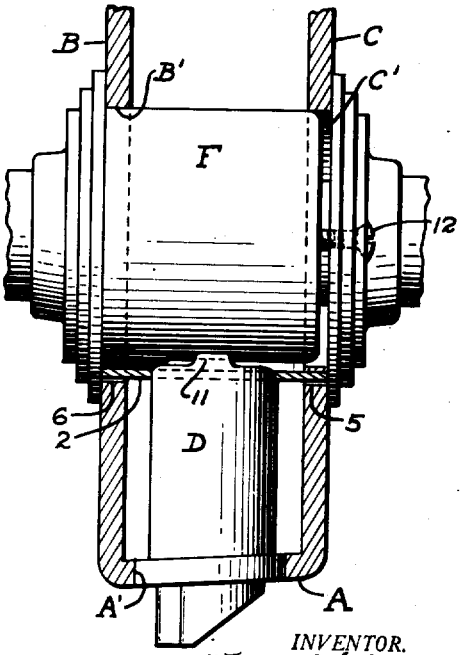
Fig. 3 is a section similar to Fig. 1 showing a modified form of lock structure.

The stile shown in Figs. 1 to 3 is constructed of fairly heavy metal, but that is not always the case, as some door stiles are constructed of fairly light metal; hence a reinforcing member interposed between the inner faces of the stile is essential. Such a reinforcing member is shown in Fig. 4. It consists of a metal plate rectangular or square in shape, as shown at 2, which is provided with a pair of lugs 3 and a central opening 4. The stile section B has a hole 5 punched or drilled therein (see Fig. 2), while the stile section C has a notch cut therein as shown at 6. The reinforcing plate 2 is smaller than the opening C′ formed in the face of the stile, and as such may be inserted therethrough, and when inserted, one of the lugs 3 will enter the hole 5 while the other lug will rest in the notch 6.

Means must also be provided for anchoring or securing the reinforcing plate against removal when inserted. This may be accomplished in several ways, for instance by providing hub members 7 on the escutcheon plates 8 (see Fig. 1), which snugly fit the openings B′ and C′ of the stile, or by providing a lock housing F, which projects through and fits the opening C′ (see Fig. 3). In either instance the lug resting in the notch 6 is secured against removal when the lock mechanism is installed, the other lug being always secured as it enters the hole 5 and can not be released except by complete removal of the reinforcing plate.

Figure 12:
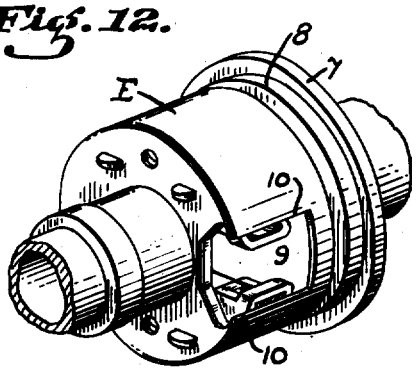
Fig. 12 is a perspective view of the latch actuating unit shown in Fig. 1.
Figure 13:
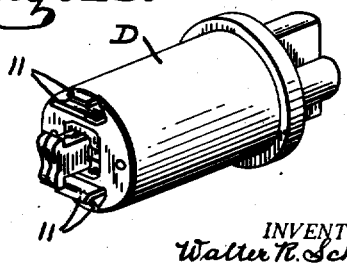
Fig. 13 is a perspective view of the latch unit shown in Fig. 1.

The manner in which the two lock units are anchored with relation to each other when installed in a door is best illustrated in Figs. 1, 12 and 13. By referring to Figs. 12 and 13, it will be noted that the housing E of the latch actuating unit is provided with a cut-out portion 9 which forms a pair of spaced parallel shoulders 10—10. The cut-out portion is provided for the reception of the inner end of the latch unit D. This unit has a pair of fingers 11—11 formed thereon which interlock with the shoulders 10—10. It is in this manner that the two units are interlocked and anchored with relation to each other. The interlock thus formed has a certain amount of play and the support given thereby would accordingly permit rattle and play. In the present instance this is overcome by use of the plate 2. This plate not only serves as a reinforcing member between the opposite faces B and C of the stile but also as a support for the inner end of the latch unit D, as clearly shown in Fig. 1. The plate, it will be observed, also performs the function of a spacer and brace against possible collapse or buckling of the opposite faces or sides of the stile.

In actual practice the plate 2 is first inserted through the opening C′. As previously stated, the latch unit is next inserted, and then the latch actuating unit E. When this is inserted, an interlock is formed between the fingers 11 and the shoulders 10—10, and the two units are thus interlocked and connected, screws being finally inserted, as shown at 12, permanently to secure the entire lock mechanism in the stile. The two units, after installation, will be rigidly secured and supported as the unit E is supported by the hubs of the escutcheon plates, while the unit D will be supported, not only by the fingers and shoulders 10 and 11 already described, but also by the plate 2. As already pointed out, the plate 2, in addition to supporting the unit D, also functions as a reinforcing plate between the inner faces of the stile. All play and rattle is thus prevented and a rigid, substantial anchorage and mounting is insured.

Figure 8:
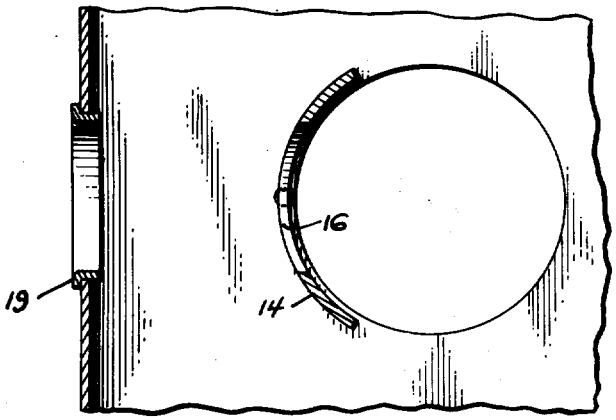
Fig. 8 is a vertical section of the stile of a hollow metal door showing a guide for the latch or the latch unit and a modified form of supporting and reinforcing plate.
Figure 9:
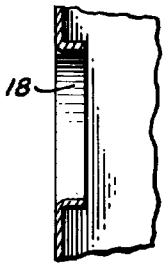
Fig. 9 shows a modification of the latch guide.
Figure 10:
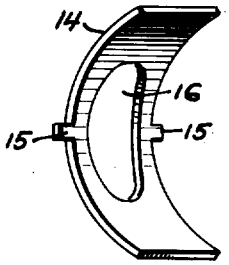
Fig. 10 is a perspective view of the reinforcing and supporting plate shown in Fig. 8.
Figure 11:
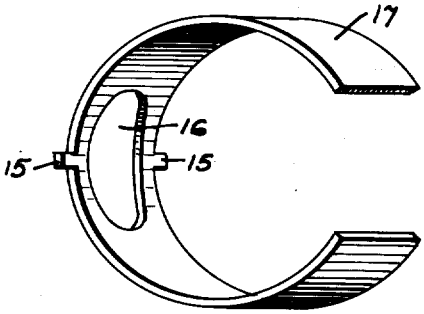
Fig. 11 shows another form of reinforcing plate.

In Figs. 1, 3 and 4 a flat reinforcing plate is disclosed. In Figs. 8 and 10 a reinforcing plate of arcuate form is employed and may be desirable in certain installations, particularly where the metal forming the hollow stile is comparatively light and thin, the arcuate reinforcing plate being clearly shown at 14 in Fig. 10. It is also provided with lugs, as shown at 15—15, and a central opening 16 to receive and support the inner end of the latch unit. If desired, the reenforcing plate may assume the form of a split ring, as shown in 17 in Fig. 11. This will afford even greater reinforcing than the arcuate plate. Whether one or the other will be employed will depend entirely upon the degree of reinforcement desired.

Where the metal of the door is comparatively heavy, as shown in Figs. 1 to 3, no extra support is required for the outer end of the latch unit, but where the metal is comparatively light or thin, an inturned flange, such as shown at 18 in Fig. 9, may be employed, or a bushing may be inserted and suitably secured as shown at 19 in Fig. 8.

In Figs. 5 to 7 a modified form of lock mechanism is shown. This is also suitable for installation in stiles of the character here disclosed. In these drawings, G indicates the latch unit and H the latch actuating unit. One member of the latch actuating unit is shown in perspective view in Fig. 7. It will there be noted that a pair of posts are provided as shown at 20 and 21. These posts extend through openings 22 and 23 formed in an anchor plate 24 secured at the inner end of the latch unit. When installing the lock, the latch unit G is first inserted; secondly, the unit shown in Fig. 7, and when it is inserted the posts 20 and 21 will pass through the openings 22 and 23 of the anchor plate. These posts secure the latch unit against endwise movement and they also form a support for the inner end of the latch unit, but they do not secure the latch unit against lateral movement. The hubs of the latch actuating unit, indicated at 25, serve this function. They are made a little longer than the hubs shown on the escutcheon plates in Fig. 1, and they are just sufficiently long to engage the opposite faces of the latch unit G and thereby secure said unit against lateral movement. A reinforcing plate may be employed in connection with this type of lock but where a heavy metal structure is employed in the forms of the stile as shown in Fig. 5, such a plate is not essential and for that reason is not shown.

Suffice it to say that whether one type of lock or another is employed, the reinforcing plate is essential, particularly where the metal structure of the door is comparatively thin or light, as said plate not only reinforces the stile of the door but it also functions as a support for the inner end of the latch unit and in all instances secures it against lateral movement. The plate 2, with its manifold functions, is simple to construct, and is readily placed in position or removed, when assembling or removing the lock, and it should furthermore be noted that it is insertable through one or another of the openings formed in the opposite faces of the stile of the door and thus can be inserted or removed as desired.

Having thus described and illustrated my invention, what I claim and desire to secure by Letters Patent is:

1. The combination with a hollow stile of a metal door, said stile having openings formed in the edge and in the face for the reception of a latch unit and a latch actuating unit, of a combination reinforcing and supporting member insertable through the openings in the face of the stile, and means for supporting said member between the inner faces of the stile when inserted, said reinforcing and supporting member being removable.

2. The combination with a hollow stile of a metal door, said stile having openings formed in the face and in the edge for the reception of a latch unit and a latch actuating unit, of a combination reinforcing and supporting member insertable through the openings in the face of the stile, and means on the latch actuating unit for securing the reinforcing and supporting member against removal when inserted.

3. The combination with a hollow stile of a metal door, said stile having openings formed in the face and in the edge for the reception of a latch unit and a latch actuating unit, of a combination reinforcing and supporting member insertable through the openings in the face of the stile, means on the latch actuating unit for securing the reinforcing and supporting member against removal when inserted, and means on said reinforcing and supporting member for receiving and supporting one end of the latch unit.

4. The combination with a hollow stile of a metal door, said stile having openings formed in the face and in the edge for the reception of a latch unit and a latch actuating unit, of means on the latch actuating unit for supporting the inner end of the latch unit against vertical and longitudinal movement, and other means on the latch actuating unit for securing the inner end of the latch unit against lateral movement.

5. The combination with a hollow stile of a metal door, said stile having openings formed in the edge and in the face for the reception of a latch unit and a latch actuating unit, of a combination reinforcing and supporting member insertable through the openings in the face of the stile, said reinforcing member engaging the inner faces of the stile, supporting lugs, one on each side of said member, the stile having openings formed therein for the reception of said lugs, and means on the latch actuating unit engageable with one of the lugs to secure the reinforcing member against removal.

6. The combination with a hollow stile of a metal door, said stile having openings formed in the face and in the edge for the reception of a latch unit and a latch actuating unit, of a combination reinforcing and supporting member insertable through the openings in the face of the stile, said reinforcing member engaging the inner faces of the stile, supporting lugs, one on each side of said member, the stile having openings formed therein for the reception of said lugs, a central opening formed in the reinforcing member to receive and support the inner end of the latch unit, and means on the latch actuating unit engageable with one of the lugs to secure the reinforcing member against removal.

7. The combination with a hollow stile of a metal door, said stile having openings formed in the face and in the edge for the reception of a latch unit and a latch actuating unit, of a combination reinforcing and supporting member insertable through the openings in the face of the stile, said reinforcing member engaging the inher faces of the stile, supporting lugs, one on each side of said member, the stile having openings formed therein for the reception of said lugs, escutcheon plates carried by the latch actuating unit, and hub members on said plates, said hubs snugly fitting the openings formed in the face of the stile and one of the hubs engaging one of the lugs on the reinforcing member and securing said member against removal.

8. The combination with a hollow stile of a metal door, said stile having openings formed in the edge and in the face for the reception of a latch unit and a latch actuating unit, of a combination reinforcing and supporting member insertable through the openings in the face of the stile, means for detachably supporting said member between the inner faces of the stile when inserted, and an opening formed in said member to receive and support the inner end of the latch unit.

9. The combination with the hollow stile of a metal door, said stile having openings formed in the edge and in the face thereof, of a latch actuating unit insertable through the openings in the face of the stile, a latch unit insertable through the opening in the edge of the stile, and a plate insertable through openings formed in the face of the stile, said plate when inserted being disposed between the latch unit and the latch actuating unit and being detachably secured between the inner faces of the stile, said plate supporting and guiding the inner end of the latch unit.

10. The combination with the hollow stile of a metal door, said stile having openings formed in the edge and in the face thereof, of a latch unit insertable in the opening formed in the edge of the stile, a face plate on the latch unit extending into and fitting said opening, a latch actuating unit insertable through the openings formed in the face of the stile, escutcheon plates on the latch actuating unit, said plates having collars extending into and fitting the openings in the face of the stile, and interlocking means formed between the two units whereby the latch unit is secured against longitudinal movement and removal.

11. The combination with the hollow stile of a metal door, said stile having openings formed in its opposite faces and in the edge for the insertion of a door lock, of a rigid member insertable independently of the lock and when inserted engaging the inner faces of the stile, and adapted and arranged to provide a spacing member between the inner faces of the stile, and fastening means to secure the lock in the hollow stile, said means clamping the spacing member between the inner faces of the stile, said spacing member being removable when the lock is removed from the door.

12. The combination with the hollow stile of a metal door, said stile having openings formed in its opposite faces and in the edge for the insertion of a door lock, said lock being narrower than the spacing between the inner faces of the stile, of a combination spacing and reinforcing member insertable through the openings formed in the opposite faces of the stile and engaging the inner faces of the stile, and fastening means to secure the lock in the hollow stile, said means clamping the spacing and reinforcing member between the inner faces of the stile.

WALTER R. SCHLAGE.